2,864,448

**PROCESS FOR SELECTIVELY AND TEMPO-
RARILY SEALING A GEOLOGICAL FOR-
MATION HAVING ZONES OF VARYING
PERMEABILITY**

Donald C. Bond and Orrin C. Holbrook, Crystal Lake,
Ill., assignors to The Pure Oil Company, Chicago, Ill.,
a corporation of Ohio No Drawing. Application December 21, 1954
Serial No. 476,852

6 Claims. (Cl. 166—22)

This invention relates to a complementary method for use in facilitating the completion or stimulation of fluid-producing zones having erratic permeability by means of formation penetrators.

Increased fluid production from subterranean reservoirs can be effected by a number of techniques, such as nitro-shooting, acidizing or hydraulic fracturing, which enhance the efficiency of reservoir drainage. In employing those techniques wherein fluid, formation penetrators capable of decreasing the resistance of a geological formation to the flow of fluids therethrough are used, e. g., acidizing or hydraulic fracturing, preliminary steps must be taken in treating formations of varying permeability to insure that most of the acid is injected into the less permeable intervals while little or no acid is introduced into the permeable sections. To facilitate an understanding of the instant invention, the following geological structural distinctions will be made:

A formation is any sedimentary bed or stratum sufficiently homogeneous to be regarded as a unit. Fluids such as petroleum oil, gas, and/or water may be found distributed throughout the formation or only in intervals or zones of the formation. Although a formation may be substantially homogeneous in composition, formations do occur which vary transversely in permeability. Where the variations are relatively thin they are referred to as streaks. There are frequently encountered intervals or zones in the formation with alternating or successive streaks of varying permeability wherein different ratios of more permeable streaks to less permeable streaks are encountered. As a general rule, it would be preferred if the formation penetrator capable of decreasing the resistance of a geological formation to the flow of fluids therethrough was introduced into those streaks having permeabilities of less than about 75 millidarcies. The selective directing of the fluid, formation penetrator capable of decreasing the resistance of a geological formation to the flow of fluids therethrough into the less permeable streaks is advantageous because maximum enhancement of the flow characteristics of a formation can be obtained with a minimum amount of treating fluid.

It is therefore an object of this invention to provide an expedient to permit the selective treatment of producing intervals with formation penetrators capable of decreasing the resistance of a geological formation to the flow of fluids therethrough. Another object of this invention is to provide a method for controlling the flow of the treating agent within the well bore so that it will penetrate only the less permeable streaks of the formation. It is also an object of this invention to provide a temporary sealant for temporarily shutting off the more permeable streaks of a fluid-producing formation to control the introduction of fluid, formation penetrators capable of decreasing the resistance of a geological formation to the flow of fluids therethrough. It is also another object of this invention to provide an economical formation sealant which will penetrate and temporarily seal intervals of relatively high permeability, and which can readily be removed from the formation interstices when desired.

In overcoming interzone and intrazone permeability differentials, a number of procedures are available. Perhaps the basic, or primary method for selectively treating intervals of lower permeability is the so-called two-pump procedure, wherein surface oil is pumped into the annulus between the tubing and the well casing while the fluid, treating reagent such as acid is pumped down the tubing and into the formation. Other methods for placing of the flow of fluid, formation penetrator capable of decreasing the resistance of a geological formation to the flow of fluids therethrough at the proper area within the well bore employ acid jet-guns for applying acid to the face of the formation by a jetting action. In addition, mechanical packers or other types of temporary tubing bridge-plugs are used to isolate the less permeable interval from the more permeable sections of the producing formation.

The selective treatment of the less permeable sections of fluid-producing formations is also effected by selectively plugging the more permeable sections of the formation. A wide variety of plugging materials may be employed, such as cement, colloidal clays, wax distillate, paper pulp, chemicals that metathetically react to produce an insoluble substance, air and gas (Jamin action), colloidal dispersions of rosin or paraffin wax, resin emulsions, and gelled plugging agents, such as petroleum distillates which have been thickened with a suitable gelling agent, e. g., kerosene thickened with a hydroxy aluminum soap. Most of these materials, however, are not inherently selective in that producing formations of varying permeability cannot be contacted indiscriminately with these materials to seal only the sections having high permeability and leave relatively unaffected the sections of low permeability. In the sealing of geological formations of this nature, it is necessary to isolate a specific zone by mechanical packers or other suitable formation isolation means. The sealant is then introduced into the isolated section, completely sealing off not only the channels of greater permeability but also the less permeable sections within the isolated zone. Unfortunately, the characteristics of these sealants do not permit the discriminate removal of the sealants from the less permeable streaks to permit their selective treatment.

According to this invention, the selective sealing of a formation of varying permeability can be brought about by introducing a refrigerated sealant which in the course of the sealing process will seal the more permeable streaks in the formation, leaving the less permeable zones substantially free from any sealing material to permit the introduction therein of a suitable formation penetrator to effect a decrease in the resistance to the flow of fluids therethrough. Suitable materials for carrying out this invention are those colloidal compositions which will form thermal-reversible gels. Such liquids, when cooled sufficiently, will gel or attain a high viscosity, making them suitable for use as temporary sealants. Examples of liquids of this nature include, but are not limited to, thermal-reversible compositions such as aqueous solutions of polyvinyl alcohols and the interpolymeric product formed by reacting acrylic acid or 2-substituted acrylic acid with acrylamide (U. S. Patents 2,506,537 and 2,476,527), aqueous gelatin, starch solutions, and cellulose acetate-benzyl alcohol mixtures.

In carrying out the instant invention, one expedient for disposing the selective sealant within the permeable zone to be sealed involves the use of three concentric passageways disposed within the well bore adjacent the formation zone being treated. Suitable passageways are provided by means of the well tubing which is provided with a suitable closure means, by the annulus between the tubing and the well casing or well wall if the bore hole is not cased, or by a macaroni string inside the tubing. The formation or formation interval, in the event that a thick pay zone is encountered, is isolated by means of a mechanical packer or other suitable means. A liquefied, normally gaseous refrigerant such as propane, butane, ammonia, the fluorochloromethanes and -ethanes, marketed under the name "Freon" by E. I. du Pont & Co., sulfur dioxide, etc., is pumped down the macaroni string, and permitted to revert to the gaseous stage at the bottom of the tubing which is disposed adjacent the formation area being treated. The resulting gas is then returned to the surface through the tubing. At the same time that the refrigerant is introduced into the well bore, a secondary heat-transfer agent which is a substantially non-viscous liquid at all temperatures involved, has a high specific heat, and is preferentially non-reactive with formation constituents, such as water, brine, non-viscous distillate oil, alcohol, glycols, etc., is then pumped down the annulus between the tubing and the well or casing wall. This heat-transfer substance is cooled by heat exchange with the gaseous refrigerant which is being returned to the surface through the tubing. The refrigerated, secondary heat-transfer agent then enters the reservoir in proportion to the variations in permeabilities. Thus, the high permeability strata are cooled to a considerable distance from the well bore while the low permeability strata are cooled only a relatively short distance from the well bore. After the required amount of coolant has been injected to give penetration to a suitable depth in the more permeable zones, the temporary sealant in its normally liquid condition is introduced into the well bore and pumped into the formation. The sealant will then enter the formation indiscriminately and will gel therein due to the low temperature of the rock. When all of the liquid sealant has been injected into the formation, injection is stopped and the well bore is allowed to warm up by heat conduction from the surrounding formation. The low permeability strata, since they were cooled only a relatively short distance from the well bore, warm up rapidly and liquefy the thermal-reversible gel. At this point, a treating agent such as acid or a fracturing fluid is injected into the formation to carry out their intended function. The more permeable strata will remain sealed for a time sufficient for the formation penetrator to be selectively introduced into the streaks of lesser permeability. After a time, the entire section which was affected will return to normal formation temperature. This will cause the peptizing of the gel remaining in the formation, and the opening up of the entire section.

Other techniques for cooling the secondary, heat-transfer agent include contacting the agent in direct heat exchange with solid carbon dioxide disposed in the well bore adjacent the formation being treated. Coils containing circulating refrigerants positioned adjacent the interval being treated may also be used to produce a refrigerated, heat-transfer agent for cooling the formation. In addition, the heat-transfer agent may be refrigerated prior to its being introduced into the bore hole. Conventional refrigerating equipment may be used for carrying out the refrigeration of the sealant at the surface. It is also possible to cool the formation without employing a refrigerated, secondary heat-transfer agent by introducing directly into the formation interstices at least one of the aforementioned liquefied, normally gaseous refrigerants. In this instance the liquefied refrigerant will penetrate the formation to a depth directly proportional to the variations in permeabilities in the same manner as when a secondary heat-transfer agent is employed. In employing this expedient, the liquefied refrigerant is introduced into the formation under a pressure sufficient to permit the refrigerant to remain in the liquid state. The pressure is then released and the resulting change in state to the aqueous phase will produce the desired cooling effect.

The instant invention is further illustrated by the following example, in which the less permeable streaks of an oolitic, limestone formation, 12 feet thick, is acidized with a 15% solution of hydrochloric acid. The formation, which is located at a depth of 5000 feet, has a formation temperature of about 115° F. Water injection is being employed as a secondary recovery technique in the treatment of this partially depleted reservoir. The well bore is fitted with a concentric series of conduits consisting of the casing, tubing disposed within the well casing, and a macaroni string contained within the tubing. Liquid propane under 500 p. s. i. surface pressure is pumped down the macaroni string simultaneous with the flow of water down the casing-tubing annulus. The water injection rate is regulated so that it will be cooled about 50° F. below the formation temperature by the vaporization of propane. After 500 gallons of the cooled water has entered the formation, the pumping of the propane into the well bore is stopped. 100 gallons of 3% by weight solution of gelatin in water is then forced into the formation. The gelatin solution will be transformed from the sol to the gel state at a temperature of about 90°–100° F. and completely plugs the formation. Accordingly, the gelatin solution gels on entering the cooled formation. Pressure is maintained on the face of the formation by introducing the hydrochloric acid formation penetrator into the well bore. Since the well bore is completely plugged, a constant pressure can be maintained. When the well bore has warmed up enough to liquefy the gel in the low permeability strata, the pressure declines rapidly, permitting the introduction of the hydrochloric acid into successive streaks of low permeability.

It is obvious that the amount of cooling which the formation requires will depend upon the normal formation temperature. Normally, the formation temperature will increase as the depth of bore hole increases. The formation temperature increases at varying rates, depending upon stratigraphic conditions. Accordingly, no specific relation between temperature and depth can be categorically set forth. Normally, the temperature increases about one degree for every 50–60 feet of depth. However, abnormalities in temperature gradients occur which do not permit the strict application of this rule. Considerable discussion on well bore temperatures is found in the prior art. For example, an interesting compilation of well bore temperatures, as well as an empirical relationship existing between temperature and depth, as well as other variables, is found in Temperature Gradients, Van Orstrand, Problems of Petroleum Geology, at page 989 et seq., American Association of Petroleum Geologists, 1934. The instant invention is especially adaptable to the treating of geological formations having a temperature between about 80–150° F.; however, formations having temperatures in excess of this may be treated, depending upon the characteristics of the sealant which is employed.

In general, the formation to be treated should be cooled to a temperature about 50° F. lower than the normal formation temperatures, although in some instances it may be possible to carry out the instant invention by cooling the formation to a temperature about 20° F. lower than the normal formation temperature. Also, lower temperatures may be used. The exact temperature will, of course, depend upon the type of gelling agent, limitations in the expedients for cooling the formation, and other factors which will be apparent to those skilled in the art.

The sealants which are employed in this invention preferably will have a transition point, where they are transformed from the sol to the gel state, and vice-versa, about half-way between the normal formation temperature and the temperature which is induced in the formation by the use of a suitable heat-transfer technique. The selection of the transition point of the sealant will, of course, depend upon the desires of those employing the instant invention. For example, in the event that the introduction of the formation penetrator capable of decreasing the resistance of a geological formation to the flow of fluids therethrough can be accomplished within a short period of time, it may be desired to employ a gelatable material which will have a transition point closer to the temperature which is induced in the formation. This will permit the formation to be completely unsealed as soon as possible. On the other hand, if longer periods of time are required for effecting the subsequent treating step, it may be necessary to employ sealants having transition points which are less than about half-way between the formation temperature and the temperature induced in the formation. The transition point of the above-described substances from which the thermal-reversible sealants are prepared can be varied in accordance with conventional methods. For example, the transition point of the interpolymeric reversible gel composition described in U. S. Patent 2,476,527 can be varied by changing the acid to amide ratio employed in the synthesis of the polymer. Other techniques for modifying the transition point of thermal-reversible gel compositions includes the use of inorganic salts as additives in the composition, and variations in the concentration of the gelling agent admixed with the liquid component of the gelatable composition.

A specific line of demarcation between those streaks which will be isolated in accordance with this invention and those streaks which will not be isolated cannot be specifically set forth inasmuch as the time element involved is an important factor in the instant invention. In other words, as has been pointed out above, after being cooled in accordance with this invention, the less permeable streaks will revert to normal formation temperature much faster than the more permeable streaks.

Therefore, the time required for the gel in the less permeable streaks to peptize and permit the formation penetrator capable of decreasing the resistance of a geological formation to the flow of fluids therethrough to enter the unsealed streaks will depend upon the rate at which the temperature reverts to normal formation temperature, characteristics of the sealant, etc. While this time can be determined experimentally, it is not necessary to do so if the preferred embodiment of the invention is employed. In carrying out this expedient it will be recalled that the entire formation is sealed by the indiscriminate introduction of the sealant. The formation penetrator capable of decreasing the resistance of a geological formation to the flow of fluids therethrough, which is disposed in the well bore, is maintained under an applied pressure. As soon as the gelled sealant in the less permeable streaks reverts to the liquid state the formation penetrator capable of decreasing the resistance of a geological formation to the flow of fluids therethrough will flow therein and function in its intended capacity. Accordingly, the formation penetrator capable of decreasing the resistance of a geological formation to the flow of fluids therethrough is introduced into the desired sections of the formation without further ado. In order to illustrate the time element involved in the transfer of heat in the formation of varying permeability for a specific set of conditions, a heat-transfer study was made on a formation having a porosity of 0.2 and a normal temperature of 150° F. From this study it was determined that when a temperature gradient of 25° F. below normal formation temperature was induced in a formation, 0.25, 10 and 60 minutes, respectively, were required for streaks having a permeability of 1, 10, and 100 millidarcies, respectively, to revert to normal formation temperature. It is thus seen that this provides sufficient time for the treatment of the less permeable streaks with a formation penetrator without treating the adjacent more permeable streaks.

The instant invention is applicable to the treatment of all types of geological formations, such as limestone, dolomitic, sandstone, etc., and may be used in the stimulation or reconditioning of oil, gas, or water-bearing reservoirs. It is especially adaptable for use in conjunction with the acidizing of geological formations employing the conventional treating reagents such as the various acids or mixtures thereof described in the prior art. It may also be employed in hydraulic fracturing techniques wherein a viscous fluid is introduced into a formation under sufficient pressure to effect its fracturing. Details of techniques used in the application of the above-mentioned formation penetrators are comprehensively discussed in the literature. For example, see Petroleum Production Engineering, Oil Field Exploitation, Uren, 3d ed., McGraw-Hill, 1953. In secondary recovery operations the instant invention has application in the reconditioning of water-injection or gas-injection wells in order to provide a uniform permeability profile for the well bore. In view of the comprehensiveness of the disclosure in the prior art directed to acidizing and hydraulic fracturing techniques, it is felt that additional comments on the use of such expedients in conjunction with the instant invention are unnecessary. However, integrated processes employing the formation sealing procedure, which is the essence of the instant invention, and the formation penetrators capable of decreasing the resistance of a geological formation to the flow of fluids therethrough described above, are considered within the scope of this invention.

Accordingly, we claim as our invention:

1. A process for selectively injecting a fluid into a subterranean rock formation of different streaks of permeability traversed by a bore hole comprising forcing into said formation through said bore hole a liquid heat-transfer medium cooled to a temperature substantially below formation temperature whereby said formation is cooled to a temperature substantially below normal formation temperature, introducing into the cooled formation a colloidal sol which at the reduced temperature of the formation sets to a gel solatable upon heating, retaining said sol within said formation until it cools to gelating temperature and forms a gel, allowing said formation to heat for a period of time sufficient for the temperature in the less permeable streaks to revert to a temperature above the gelating temperature of said sol but insufficient to allow the temperature in said more permeable streaks to rise to said gelating temperature, whereby said sol will remain temporarily gelated in said more permeable streaks but will revert to the sol state in said less permeable streaks, and injecting said fluid into said less permeable streaks after the gel therein has reverted to the sol state and the more permeable streaks are temporarily sealed by said gel.

2. Process in accordance with claim 1 in which the fluid is an acidizing agent.

3. Process in accordance with claim 2 in which the heat-transfer medium is water.

4. Process in accordance with claim 1 in which the sol is selected from the group of aqueous solutions of polyvinyl alcohols, interpolymeric products of the reaction of arylic and 2-substituted arylic acid with arylamide, gelatin, starch, and cellulose acetate-benzyl alcohol mixtures.

5. Process in accordance with claim 3 in which the water is cooled about 50° F. below formation temperature.

6. Process in accordance with claim 5 in which the sol introduced into the cooled formation is an aqueous solution of gelatine.

References Cited in the file of this patent

UNITED STATES PATENTS

| | | |
|---|---|---|
| 1,307,027 | Swan | June 17, 1919 |
| 2,274,297 | Irons et al. | Feb. 24, 1942 |
| 2,693,857 | Marshall | Nov. 9, 1954 |
| 2,734,861 | Scott et al. | Feb. 14, 1956 |
| 2,772,737 | Bond et al. | Dec. 4, 1956 |
| 2,787,325 | Holbrook | Apr. 2, 1957 |
| 2,801,698 | Bond | Aug. 6, 1957 |
| 2,801,699 | Sayre et al. | Aug. 6, 1957 |

UNITED STATES PATENT OFFICE
CERTIFICATE OF CORRECTION

Patent No. 2,864,448                               December 16, 1958

Donald C. Bond et al.

It is hereby certified that error appears in the printed specification of the above numbered patent requiring correction and that the said Letters Patent should read as corrected below.

Column 4, line 9, for "aqueous" read -- gaseous --; line 17, for "seocndary" read -- secondary --; column 6, line 70, for "arylic", both occurrences, read -- acrylic --; same line, for "arylamide" read -- acrylamide --.

Signed and sealed this 31st day of March 1959.

SEAL)

ttest:

ARL H. AXLINE ttesting Officer

ROBERT C. WATSON
                                                        Commissioner of Patents